United States Patent [19]
Yamamoto

[11] Patent Number: 5,786,864
[45] Date of Patent: Jul. 28, 1998

[54] MOVING PICTURE PROCESSING APPARATUS AND METHOD WHEREIN IMAGE DATA AND SPECIAL EFFECTS DATA ARE TRANSMITTED IN COMMON

[75] Inventor: Kunihiro Yamamoto, Tokyo, Japan

[73] Assignee: Canon Kabushiki Kaisha, Tokyo, Japan

[21] Appl. No.: 611,979

[22] Filed: Mar. 6, 1996

Related U.S. Application Data

[63] Continuation of Ser. No. 144,655, Nov. 2, 1993, abandoned.

[30] Foreign Application Priority Data

Nov. 5, 1992 [JP] Japan .................................. 4-295602

[51] Int. Cl.$^6$ ....................................................... H04N 7/08
[52] U.S. Cl. ........................... 348/473; 348/595; 348/578; 348/700; 348/722
[58] Field of Search ................................ 348/473, 443, 348/426, 699–701, 578, 593, 595, 584, 722

[56] References Cited

U.S. PATENT DOCUMENTS

| | | | |
|---|---|---|---|
| 4,872,054 | 10/1989 | Gray et al. .................. | 358/140 |
| 4,935,815 | 6/1990 | Ichikawa et al. .............. | 358/140 |
| 5,027,212 | 6/1991 | Marlton et al. ................ | 358/22 X |
| 5,060,064 | 10/1991 | Lamnabhi et al. ............. | 358/140 X |
| 5,081,531 | 1/1992 | Parker ........................... | 358/140 |
| 5,115,311 | 5/1992 | Jaqua ............................ | 358/140 |
| 5,134,484 | 7/1992 | Willson ......................... | 358/183 |
| 5,138,448 | 8/1992 | Gillies et al. ................. | 348/443 |
| 5,189,530 | 2/1993 | Fujii .............................. | 358/458 |
| 5,227,875 | 7/1993 | Suu et al. . | |
| 5,353,063 | 10/1994 | Tagisawa et al. .............. | 348/426 |

FOREIGN PATENT DOCUMENTS

| | | |
|---|---|---|
| 0330732 | 9/1989 | European Pat. Off. . |
| 0456433 | 11/1991 | European Pat. Off. . |
| WO91/07845 | 5/1991 | WIPO . |

OTHER PUBLICATIONS

Langlais, et al. "TVS 34: Encoding/Decoding Equipment for 34 Mbit/s TV Transmission," PTR Philips Telecommunication and Data Systems Review, pp. 34–40, vol. 48, No. 3, (Sep. 1990).

Patent Abstracts of Japan, vol. 16, No. 517, Oct. 1992, Abstract of Japanese Patent Document No. 4-192696, Jul. 1992.

Patent Abstracts of Japan, vol. 16, No. 336, Jul. 1992, Abstract of Japanese Patent Document No. 4-100379, Apr. 1992.

Patent Abstracts of Japan, vol. 16, No. 340, Jul. 1992, Abstract of Japanese Patent Document No. 4-103271, Apr. 1992.

*Primary Examiner*—Victor R. Kostak
*Attorney, Agent, or Firm*—Fitzpatrick, Cella, Harper & Scinto

[57] ABSTRACT

Moving-picture processing apparatus and method wherein image data and special effects data are transmitted in common in a time-division manner includes receiving structure and method for receiving, in a time-division manner, (i) coded digital moving-picture data which represent a moving picture and (ii) command data for commanding image modification processing to be applied to the digital moving-picture data. Decoding structure and method is provided for decoding the coded digital moving-picture data. A processor is provided for subjecting the digital moving-picture data received by the decoding structure to the image modification processing. Image forming structure forms an image in dependence upon the digital moving-picture data processed by the processor. The digital moving-picture data and the command data are transmitted through a common transmission line. This avoids the prior art problem of performing image modification processing before the data is encoded for transmission, thus causing, e.g., jerky transitions at fade out/in transitions.

45 Claims, 7 Drawing Sheets

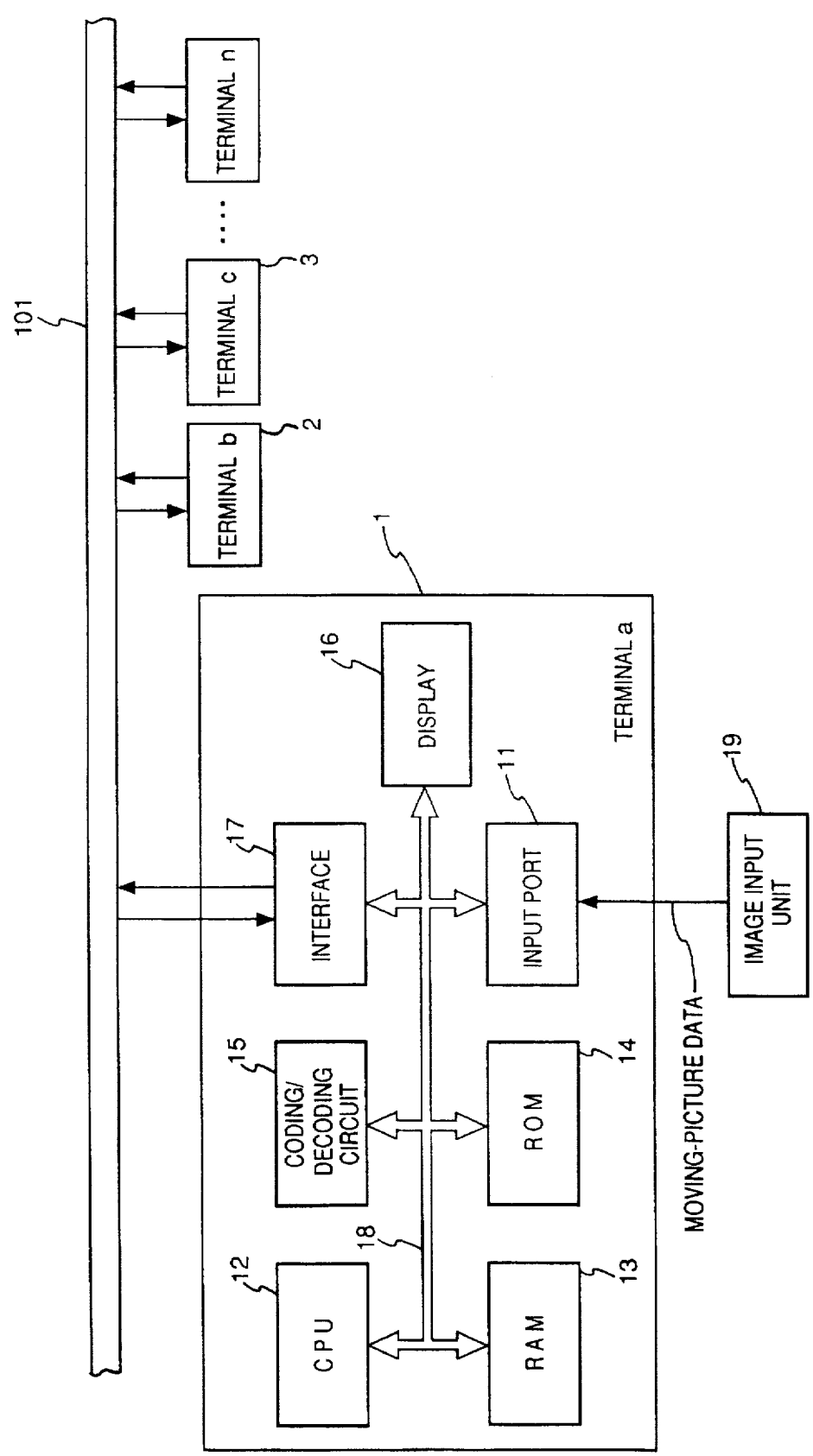

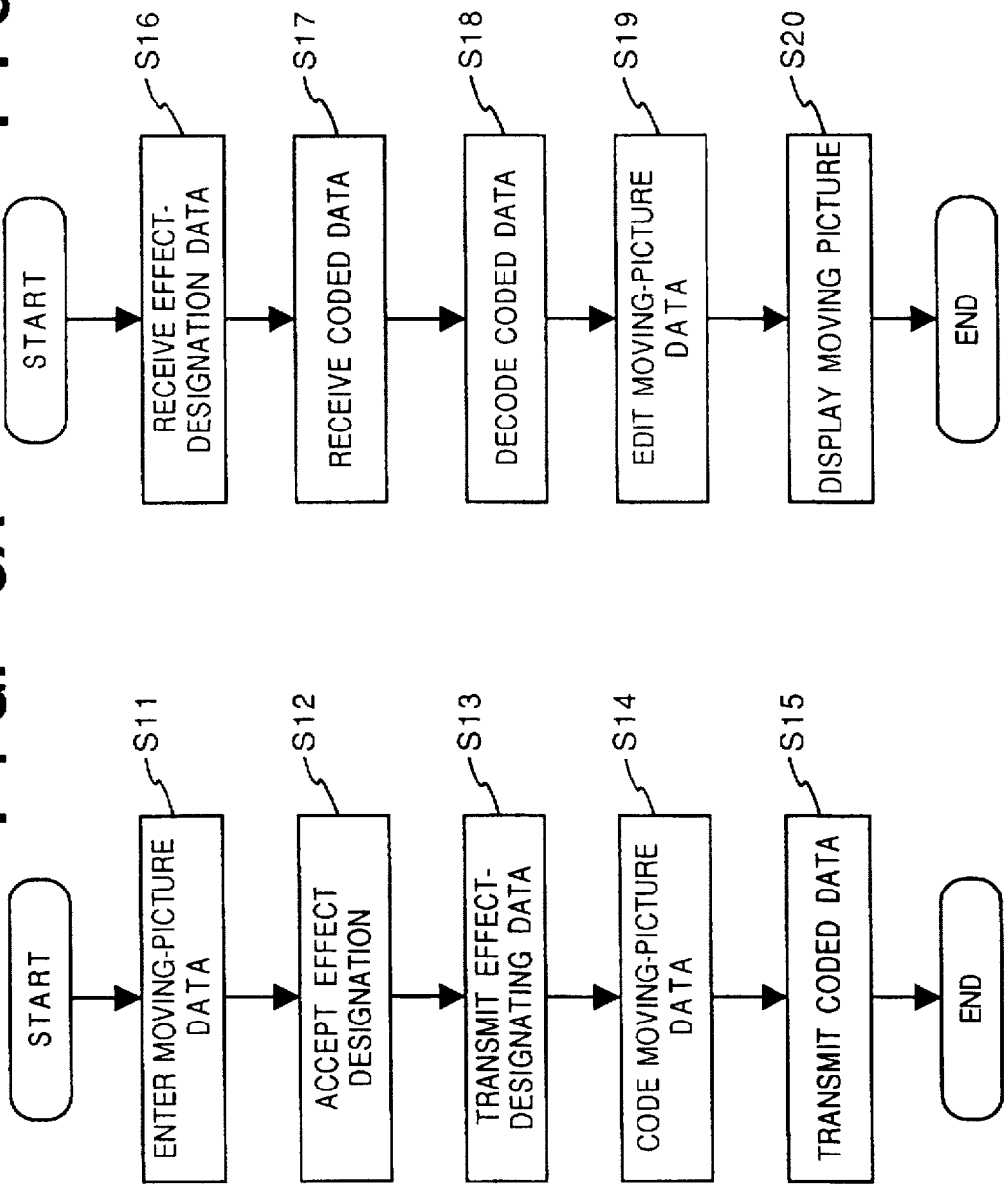

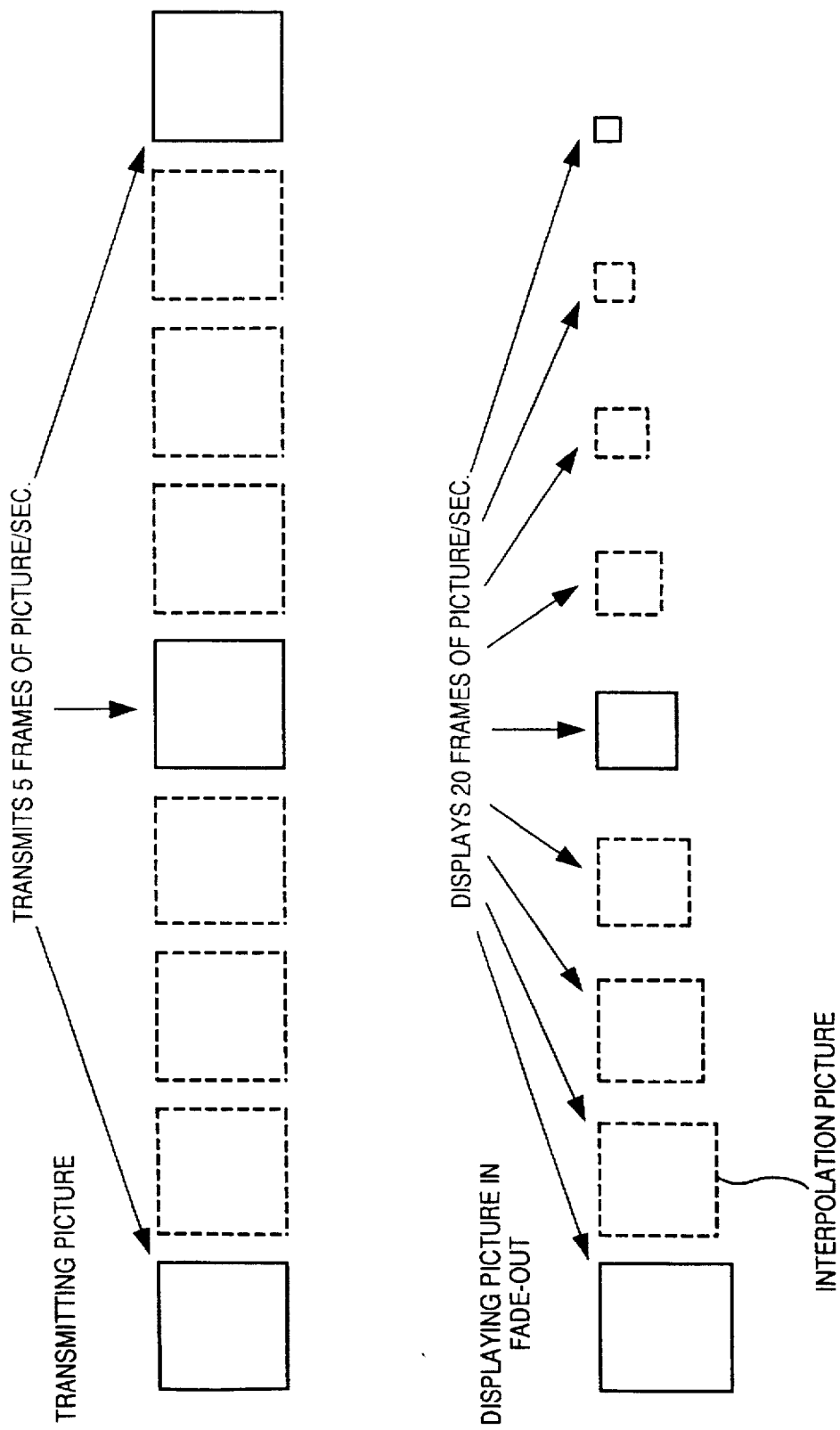

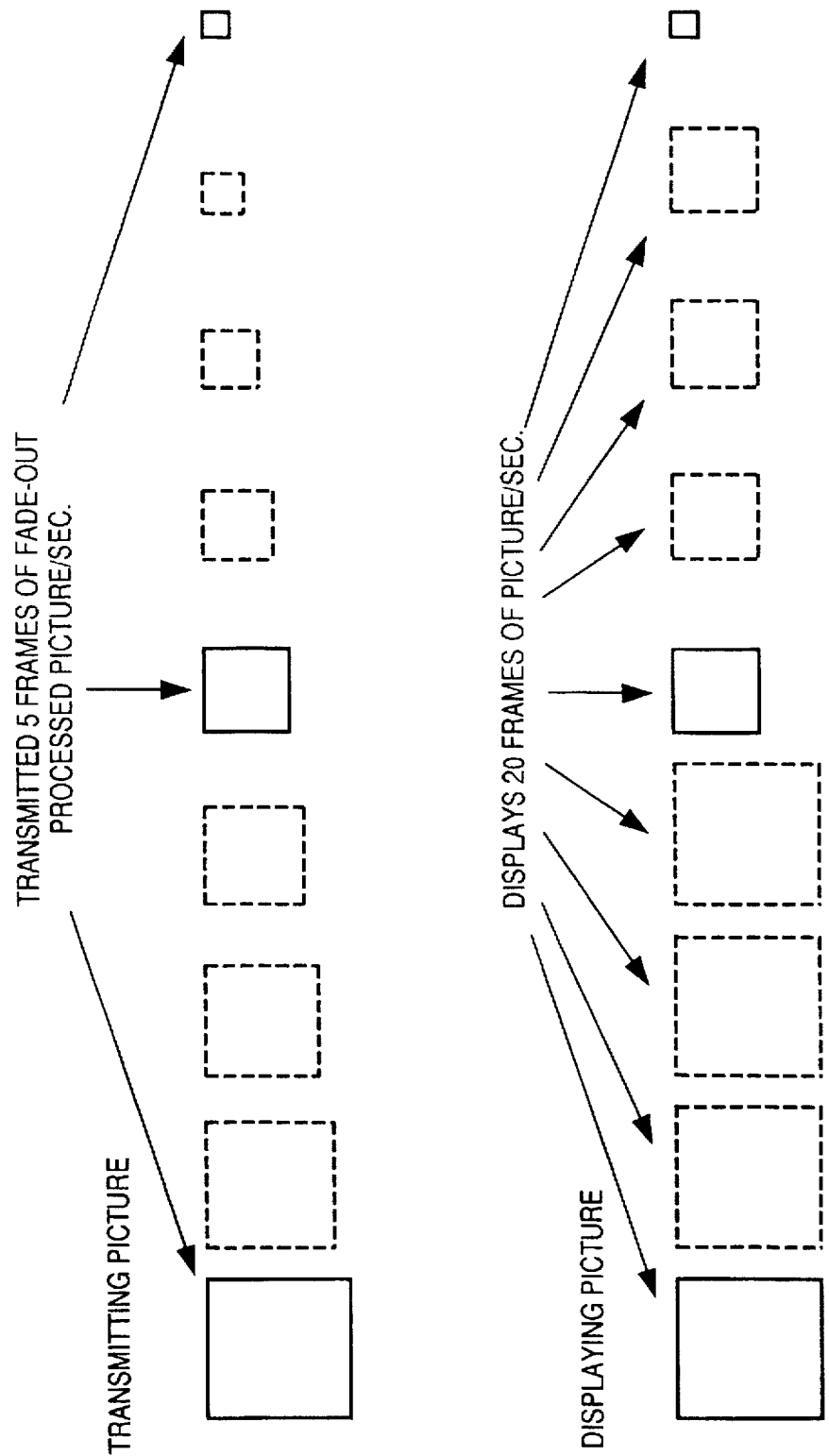

MOVING PICTURE PROCESSING APPARATUS AND METHOD WHEREIN IMAGE DATA AND SPECIAL EFFECTS DATA ARE TRANSMITTED IN COMMON

This application is a continuation of application Ser. No. 08/144,655 filed Nov. 2, 1993, now abandoned.

BACKGROUND OF THE INVENTION

1. Field of the Invention

This invention relates to a method and apparatus for moving-picture processing and, more particularly, to a moving-picture processing method and apparatus for subjecting a moving picture to such editing as superimposition processing, transition effects, etc.

2. Description of the Related Art

When digital moving-picture data is edited, compressed and transmitted in the prior art, the general practice is to edit the moving-picture data and then compress the moving-picture data that has been processed. It should be noted that the term "editing" as used here means superimposing a character, figure or the like on a moving picture or subjecting a moving picture to a transition effect, described below.

The transition effect is processing for the purpose of smoothly connecting two moving-picture sequences that are continuous in terms of time and involves causing the moving picture that is earlier in time to fade out while causing the moving picture that is later in time to fade in. In this case, an image having a special state in which the two moving-picture sequences are superimposed appears within a range designated in a transition interval.

The edited moving-picture data thus obtained is coded by any moving-picture coding method available and the coding data is transmitted to the receiving side through a communication line. The coded data received is decoded and displayed on the receiving side.

FIGS. 2A, 2B are flowcharts illustrating procedures for editing moving pictures according to the prior art, in which FIG. 2A shows the procedure performed by the terminal on the transmitting side and FIG. 2B the procedure performed by the terminal on the receiving side.

According to the flowchart shown in FIG. 2A, the terminal on the transmitting side enters the moving-picture data and stores it in a memory at step S1. Next, the terminal on the transmitting side accepts an effect designation, such as a designation of the transition effect, at step S2, after which the terminal edits the moving-picture data, which has been stored in the memory, on the basis of the designation accepted at step S2. This is followed by step S4, at which the terminal on the transmitting side codes the edited moving-picture data, and then by step S5, at which the terminal transmits the coded data.

Next, according to the flowchart shown in FIG. 2B, the terminal on the receiving side receives the coded data at step S6. Then, at step S7, the terminal on the receiving side decodes the coded data received and stores the moving-picture data thus decoded in a memory. The terminal on the receiving side displays the moving picture on a display unit at step S8.

However, the technique described above involves a number of problems.

Specifically, in the above-described technique, the edited image data that has been subjected to the transition effect or the like is coded. However, in the conventional moving-picture coding method that performs compression utilizing the correlation of mutually adjacent frames, the frame correlation is lost and efficient compression is difficult when it is attempted to compress special image data that has been subjected to the transition effect or the like.

Further, according to some moving-picture coding methods, data is transmitted upon being thinned out and coded at a frame rate of ten frames per second in order to achieve a rate of compression. However, in the case of a moving picture having a low frame rate, a smooth transition effect is difficult to realize and the transition of the picture becomes too jerky.

In the display of superimposed captions in moving pictures such as television pictures and movies, often the color white, of some brightness, is used for the captions in order to enhance readability. However, in the case of a compression method based upon quantization in a frequency region according to the MPEG standard or the like, mosquito noise is produced at the periphery of the characters when a moving picture having a caption superimposed on it is compressed. In addition, owing to the concentration of bits in the character portions, the quality of the overall picture deteriorates (in comparison with a picture not having superimposed captions).

Furthermore, there are many problems in terms of operability as far as the user is concerned. For example, the position of a caption usually is fixed at the bottom of the screen and the display position cannot be changed at will. In addition, when a caption becomes unnecessary, a changeover cannot be made to a mode in which the caption is not displayed.

Another problem is that a changeover cannot be made between Japanese and English captions when viewing captions in a moving picture such as a movie. Furthermore, when two kinds of captions are required, it is necessary for the user to acquire two types of moving-picture data that differ only in terms of their captions. Moreover, the producer is required to produce different editions depending upon the sales area (English-speaking areas, Japanese-speaking areas, etc.). This involves considerable waste.

SUMMARY OF THE INVENTION

An object of the present invention is to eliminate the foregoing drawbacks of the prior art.

More specifically, an object of the present invention is to prevent a decline in compression rate in code and uncoding as well as a deterioration in picture quality.

According to the present invention, the foregoing objects are attained by providing a moving picture processing apparatus comprising receiving means for receiving coded digital moving-picture data and command data for commanding effect processing to be applied to the digital moving-picture data, decoding means for decoding the coded digital moving-picture data, processing means for subjecting the digital moving-picture data decoded by the decoding means to effect processing, and image forming means for forming an image in dependence upon the digital moving-picture data processed by the processing means. The digital moving-picture data and the command data are transmitted by a common transmission line.

Another object of the present invention is to realize the transition effect efficiently and with excellent image quality.

A further object of the present invention is to fully perform a superimposing function.

Other features and advantages of the present invention will be apparent from the following description taken in conjunction with the accompanying drawings, in which like reference characters designate the same or similar elements throughout the figures thereof.

BRIEF DESCRIPTION OF THE DRAWINGS

FIG. 1 is a block diagram illustrating an example of the configuration of a system for processing a moving picture by a moving-picture processing method according to a first embodiment of the present invention;

FIGS. 3A and 3B are flowcharts illustrating procedures for editing a moving picture according to the first embodiment of the present invention;

FIG. 6A is a diagram illustrating a fade-out processing according to a first embodiment of the present invention; and FIG. 6B is a diagram illustrating a conventional fade-out processing.

DESCRIPTION OF THE PREFERRED EMBODIMENTS

Figure 2B:
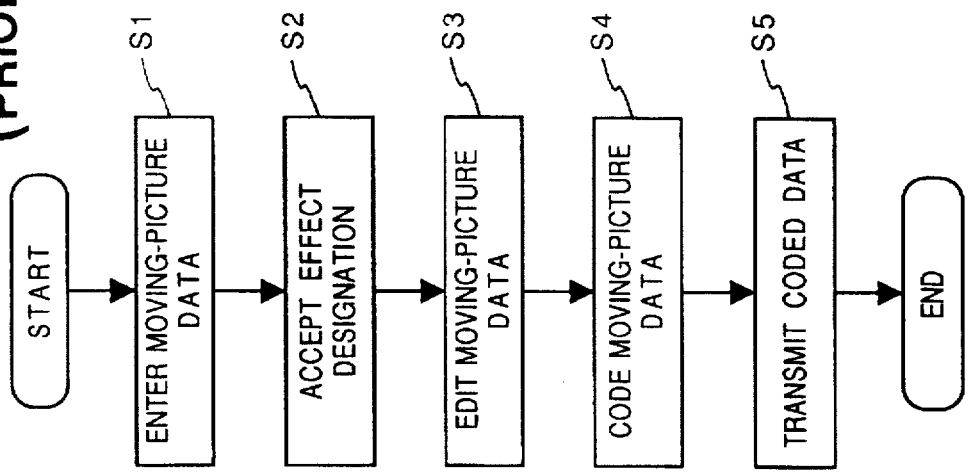
FIGS. 2A and 2B are flowcharts illustrating procedures for editing a moving picture according to the prior art.
Figure 2A:
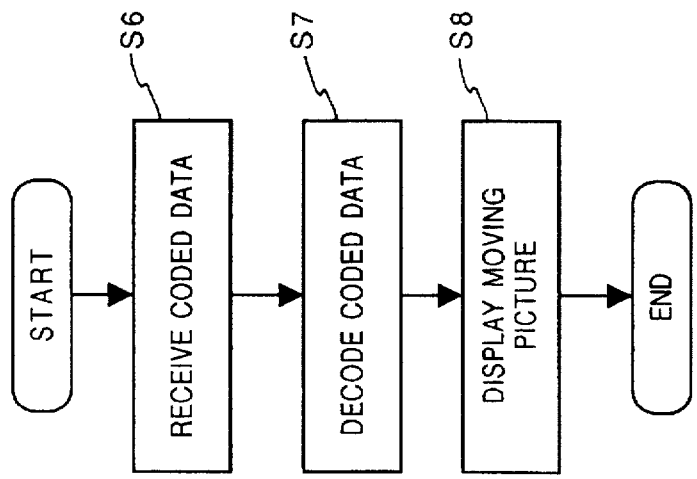

Methods of processing a moving picture according to embodiments of the present invention will now be described in detail with reference to the drawings.

First Embodiment

FIG. 1 is a block diagram illustrating an example of the configuration of a system for processing a moving picture according to a first embodiment of the present invention.

The system shown in FIG. 1 is composed of a plurality of terminals a1, b2, c3, . . . interconnected by a communication line 101. The terminal a1 is constructed as set forth below.

Specifically, the terminal a1 includes an input port 11 for accepting moving-picture data from an image input unit 19 such as a video camera, and a CPU 12 for executing the processing of image data in accordance with a control program stored in a ROM 14 as well as overall control of the terminal a1 via a bus 18. Further, by accessing a prescribed area in a RAM 13, the CPU 12 is capable of reading out a pixel value at any coordinates of any frame of the moving-picture data stored in the RAM 13.

The terminal a1 further includes a coding/decoding circuit 15, a display 16 and an interface 17 through which data communication is performed with the communication line 101.

The aforementioned components of the terminal a1 are interconnected by a bus 18.

The terminals b2, c3, . . . n have substantially the same construction as that of the terminal a1.

FIGS. 3A and 3B are flowcharts illustrating procedures for editing a moving picture according to the first embodiment of the present invention, in which FIG. 3A shows the procedure performed by a terminal on the transmitting side, and FIG. 3B shows the procedure performed by a terminal on the receiving side.

According to the flowchart shown in FIG. 3A, the terminal on the transmitting side according to this embodiment reads moving-picture data into the RAM 13 via the input portion 11 at step S12. Next, the terminal on the transmitting side accepts a plurality of effect designations, such as a superimposing designation or a designation of the transition effect (fade out, wipe, etc.), at step S12. Next, the transmitting terminal sends effect-designating data (command data), which has been accepted at step S12 to the communication line 101 at step S13. This is followed by step 14 at which the transmitting terminal codes the moving-picture data by the coding/decoding circuit 15, and then by step S15 at which the coded data is sent to the communication line 101 via the interface 17. It should be noted that an arrangement may be adopted in which the moving-picture data is coded in advance and the effect-designating data is attached thereto before the moving-picture data is sent to the communication line 101.

More specifically, in this embodiment, the effect designating data and the coded, unedited moving-picture data are transmitted.

Next, according to the flowchart shown in FIG. 3B, the terminal on the receiving side receives the effect designating data via the interface 17 at step S16 and stores this data in the RAM 13. The receiving terminal then receives the coded data of the moving-picture data via the interface 17 at step S17 and stores this data in the RAM 13. This is followed by step S18, at which the receiving terminal decodes the coded data, which has been stored in the RAM 13, by the coding/decoding circuit 15 and then stores the moving-picture data obtained by decoding in the RAM 13. Next, at step S19, the terminal on the receiving side edits the moving-picture data, which has been stored in the RAM 13, based upon the effect-designating data stored in the RAM 13.

The editing operation may be performed as follows, by way of example:

Assume that the rate of the received moving-picture data is five frames per second, and that the display rate of the display 16 is 20 frames per second. If command data for performing fade-out has been received, fade-out processing is executed after performing interpolation between frames of the moving picture of five frames per second and creating moving-picture data of 20 frames per second (FIG. 6A). The simplest example of interpolation processing here is merely to repeat the same picture for four frames. Note that moving-picture data according to the conventional processing is as shown in FIG. 6B.

Furthermore, besides fade-out, a transition effect such as wiping also can be carried out through a method similar to that described above.

Finally, at step S20, the terminal on the receiving side displays the moving picture on the display unit 16.

Thus, according to this embodiment of the invention, after the effect-designating data and moving-picture data have been received at the terminal on the receiving side, the moving-picture data obtained by decoding the coded data is edited based upon the effect designating data.

When it is attempted to superimpose characters, for example, upon a moving picture in the example of the prior art described above, the image data on which line-drawing data (i.e., a character) has been superimposed is coded. In a well-known moving-picture coding method (e.g., a coding method according to the MPEG) the main purpose of which is to compress a natural image, compression cannot be performed efficiently and, hence, there is an increase in the amount of coded data, when it is attempted to improve picture quality. On the other hand, when it is attempted to raise the compression rate, there is a marked decline in picture quality. For example, it may become difficult to read the characters. Furthermore, when fade-out of a moving picture is performed in a case where the moving-picture data is transmitted at a low frame rate of ten frames per second in the prior art, a change in the image to be faded out also is expressed at a low frame rate. As a result, a jerky, crude effect is all that is obtained.

By contrast, in accordance with the present embodiment, the superimposing of characters is carried out immediately before the display of the image in the terminal on the receiving side. As a result, there is no decline in compression efficiency and no deterioration in picture quality. Further, in a case where fade-out of a moving picture is performed according to this embodiment, it is easy to make the frame rate solely of the changing portion of the image to be faded out higher than that of other portions by performing the above-described interpolation processing in the terminal on the receiving side. This makes it possible to obtain smooth fade-out without any deterioration in the transmission efficiency of the image data.

In the foregoing description and in the drawings, an example is described in which coding/decoding of a moving picture is carried out by the coding/decoding circuit 15. However, the embodiment is not limited to this arrangement. For example, the coding/decoding of the moving picture may be realized by software processing executed by the CPU 12. Though processing speed will decline in such case, the cost of the terminal can be reduced.

Further, in the foregoing description and in the drawings, an example is described in which moving-picture data entered by the input port 11 or coded data received by the interface 17 is stored in the RAM 13 as is. However, the embodiment is not limited to this arrangement. For example, by providing a sufficiently fast coding/decoding circuit, coding may be performed in real time while the moving-picture data is being entered or decoding may be performed in real time while coded data is being received, with the data then being stored in the RAM 13. In this case, the processing speed can be raised or, in the former case, the memory capacity of the RAM 13 can be reduced.

Further, in the foregoing description and in the drawings, an example is described in which a RAM is used for the storing of data. However, the embodiment is not limited to this arrangement. For example, if high-speed processing is not required, an external storage device such a hard disk may be employed. In such case, a large quantity of moving-picture data can be processed at low cost.

Thus, in accordance with the embodiment as described above, moving-picture data is edited in a terminal on the receiving side, whereby a high-quality moving-picture transmission can be realized without inviting a decline in compression efficiency or a deterioration in picture quality by coding/decoding.

It should be noted that the terminal according to this embodiment may be a system composed of a plurality of devices, e.g., a system of video cameras or host computers, or an apparatus comprising a single device, e.g., a host computer in which a moving picture is stored.

Further, the processing according to this embodiment may be realized by supplying a program, which has been stored on a medium, to a system or apparatus.

Thus, in accordance with the first embodiment of the present invention, there can be provided a moving-picture transmitting method for transmitting information for editing moving-picture data, coding the moving-picture data efficiently and then transmitting the coded data.

Further, in accordance with the first embodiment of the present invention, there can be provided a moving-picture transmitting method for editing moving-picture data, which has been obtained by decoding coded data that has been received, based upon the received editing information.

Second Embodiment

According to this embodiment of the invention, the moving-picture processing method of the first embodiment described above is applied to a technique in which text is superimposed on a picture in synchronism with a moving picture, as in the case of captions superimposed on a movie or the words to a song superimposed on a moving picture in a karaoke sing-along system.

In this embodiment, moving-picture data and text data such as captions are held separately. At playback, the text such as captions is developed into a bitmap and superimposed on the picture. As a result, it is possible to prevent a deterioration in picture quality, at the time of image compression/decompression, caused by the insertion of text such as captions. At the same time, the above-described problems of operability are solved.

The second embodiment of the present invention will be described with reference to the drawings.

Figure 4:
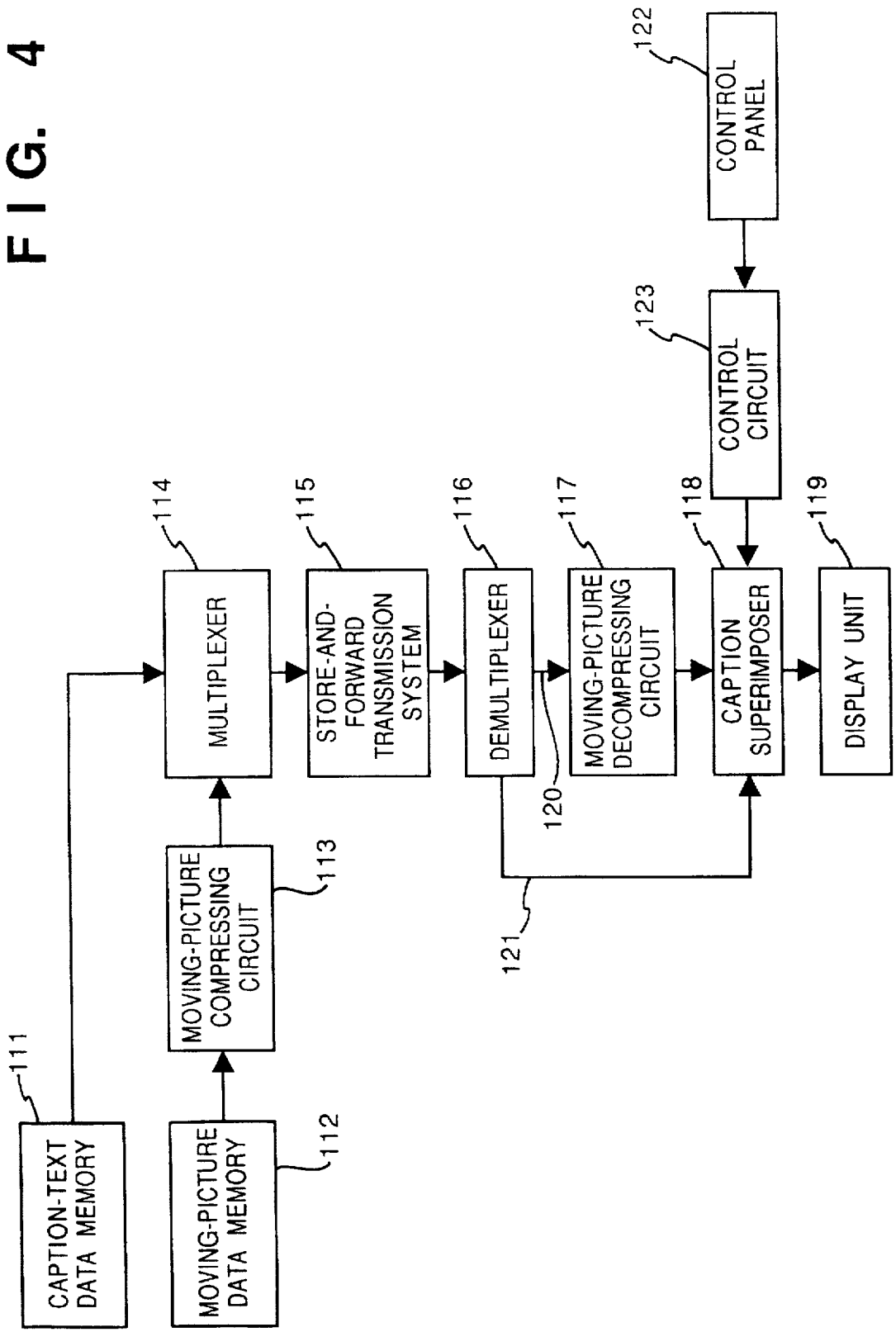
FIG. 4 is a block diagram of a second embodiment according to the present invention.

FIG. 4 is a block diagram showing a moving-picture processing system according to this embodiment. The system includes a memory 111 for storing caption text data, a memory 112 for storing moving-picture data, a moving-picture compressing circuit 113, a multiplexer 114, a store-and-forward transmission system 115, a demultiplexer 116, a moving-picture decompressing circuit 117, a caption superimposer 118, a display unit 119 and signal lines 120, 121.

Moving-picture data that has been accumulated in the memory 112 is compressed by the moving-picture compressing circuit 113, and this data is combined with text data, which has been accumulated in the memory 111, in the multiplexer 114. The combined data is sent from the multiplexer 114 to the store-and-forward transmission system 115. The store-and-forward transmission system 115, which may be packaged media such as a tape or CD-ROM or a communication system such as an ISDN or TV broadcast, is used to deliver data to the location of the user. The data accepted by the user is separated into compressed-image data and text data by the demultiplexer 116. The image data is sent to the moving-picture decompressing circuit 117 through the signal line 120. The text data is sent to the caption superimposer 118 through the signal line 121, and the superimposer 118 develops the text data into a bit-mapped text image and superimposes the bit-mapped text image on the moving picture decompressed by the moving-picture decompressing circuit 117. The thus obtained moving picture having captions is displayed by the display unit 119. It should be noted that the moving picture can be obtained as hard copies frame by frame using an image forming apparatus (such as a laser printer) instead of the display unit. Further, it is possible to print out only the captions.

A noteworthy feature of this embodiment is that caption superimposer 118 is located on the side of the user. In addition, by employing a control panel 122, the user can set display/non-display of captions, the color of the caption display and its position on the screen as well as the size of the characters. On the basis of the settings made, a control circuit 123 controls the superimposing operation by means of the caption superimposer 118.

With the conventional transmission method described earlier, the caption superimposer is located on the transmitting side (the side of the producer of the moving picture), and therefore captions are always displayed at a fixed position. By contrast, in accordance with this embodiment, the user applies commands to the caption superimposer so that it is possible to freely set display/non-display of captions, the color of the caption display and its position on the screen as well as the size of the characters. This represents a great improvement in operability. Furthermore, in accordance with this embodiment, it is possible to provide the excellent picture quality and compression efficiency described above.

Further, an MPEG encoder, which is a moving-picture compression system in accordance with international standards, can be used as the moving-picture compressing circuit 113 shown in FIG. 4. Since a "user data area" is defined in the MPEG bit stream and any data can be written in for each picture in conformity with the MPEG, the multiplexer 114 performs an operation through which the text data is written in the "user data area". The demultiplexer 116 reads out text data from the "user data area" of the MPEG bit stream and sends it to the caption superimposer 118. The moving-picture decompressing circuit 117 uses an MPEG decoder.

In accordance with this embodiment, an advantage is that it is possible to generate coded data that is in conformity with the MPEG.

In a case where data is reproduced using an ordinary MPEG decoder instead of the method of reproduction described in this embodiment, the user data area is ignored so that captions simply are no longer capable of being displayed. The moving picture, however, can be still reproduced correctly. Thus, compatibility is maintained.

In accordance with the second embodiment of the invention as described above, it is possible to avoid a deterioration in picture quality caused by text being superimposed on the picture. In addition, the user is capable of freely selecting the method of displaying captions.

Figure 5:
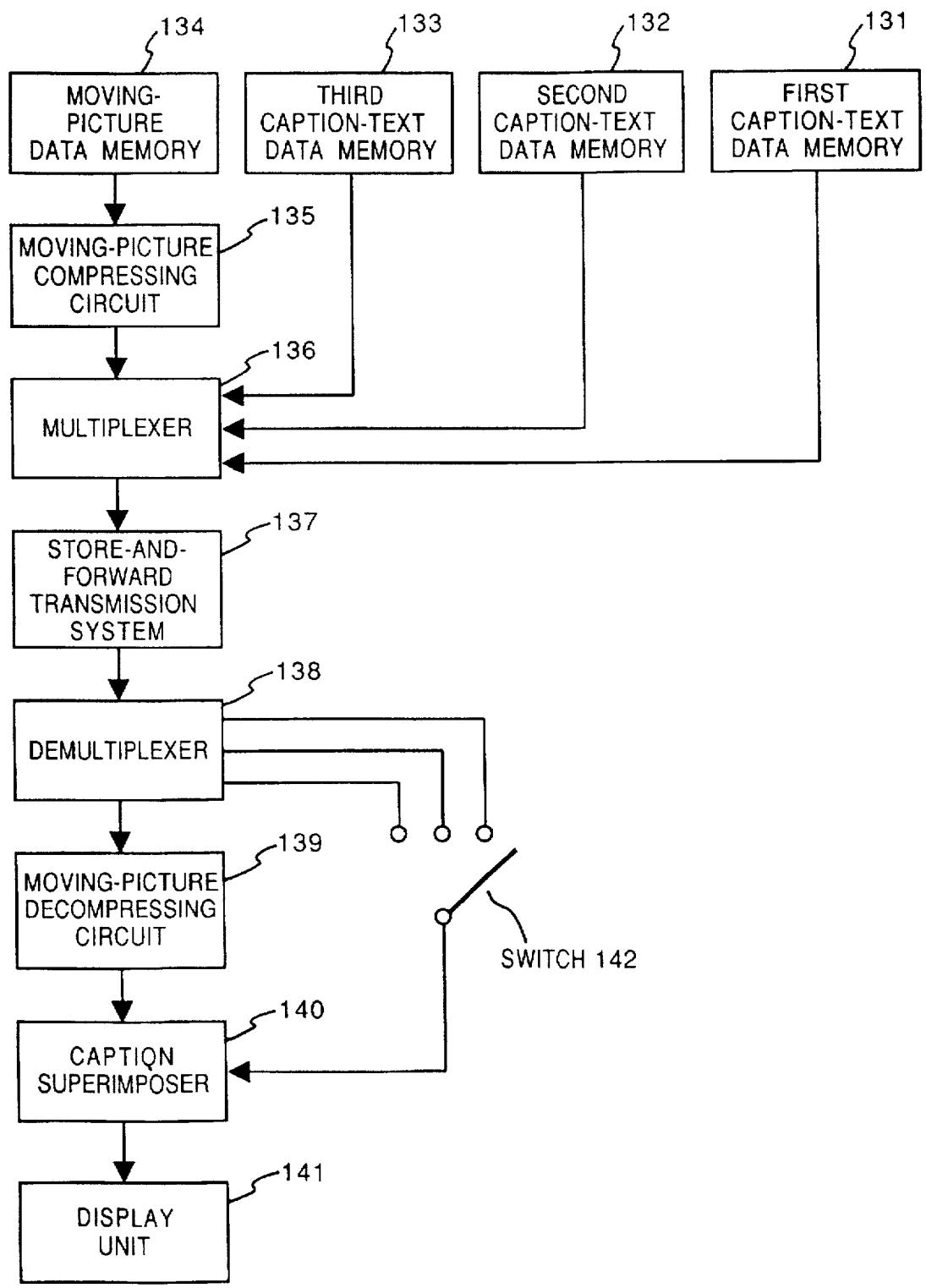
FIG. 5 is a block diagram of a third embodiment according to the present invention.

FIG. 5 is a block diagram showing a moving-picture processing system according to a third embodiment. The system includes memories 131, 132, 133 for storing caption text data, a memory 134 for storing a moving picture, a moving-picture compressing circuit 135, a multiplexer 136, a store-and-forward transmission system 137, a demultiplexer 138, a moving-picture decompressing circuit 139, a caption superimposer 140, a display unit 141 and a changeover switch 142.

The memories 131, 132, 133 contain different types of text data. For example, assume that the memories 131, 132, 133 contain captions in Japanese, English and Chinese, respectively. These three types of text data are sent to the multiplexer 136, which superimposes the data on image data obtained from the memory 134 and then compressed via the moving-picture compressing circuit 135. The resulting data is sent to the store-and-forward transmission system 137.

On the receiving side, the data is passed through the demultiplexer 138 to separate it into the compressed image data and the three types of text data. The compressed image data is decompressed by the moving-picture decompressing circuit 139 and the decompressed data is then sent to the caption superimposer 140. Any one of the three types of text data is selected by the switch 142. According to this embodiment, the user is capable of selecting a caption in the desired language from among the captions in three languages. The text data selected is developed into a bitmap by the superimposer 140 and superimposed upon the moving picture, with the result being displayed on the display unit 141.

By adopting the arrangement described above, the user is capable of selecting and displaying any caption of a plurality of types.

Though the types of caption text are made available in three systems, it goes without saying that this does not constitute a limitation. Caption text of types in any number of systems can be entered to the extent allowed by the capacity of the store-and-forward transmission system and the transfer capability. In addition, it is not necessary to prepare text in a number of languages, and it goes without saying that text having different content in the same language can be entered as well.

Instead of developing text into a bitmap and superimposing it on an image, an arrangement may be adopted in which text is read by a voice synthesizer and either mixed with audio that accompanies a moving picture or substituted for the audio before playback is performed.

As many apparently widely different embodiments of the present invention can be made without departing from the spirit and scope thereof, it is to be understood that the invention is not limited to the specific embodiments thereof except as defined in the appended claims.

What is claimed is:

1. A moving-picture processing apparatus comprising:
receiving means for receiving from an external apparatus (i) digital moving-picture data which is coded in accordance with a coding method that utilizes correlation between a plurality of frames, represented by the coded digital moving-picture data, and (ii) command data for commanding image modification processing to be applied to the digital moving-picture data;
decoding means for decoding the coded digital moving-picture data; and
image modification processing means for subjecting the digital moving-picture data decoded by said decoding means to image modification processing in accordance with the command data, and
wherein said image modification processing comprises superimposing processing.

2. The apparatus according to claim 1, wherein said command data includes text data of a plurality of types.

3. The apparatus according to claim 2, further comprising selecting means for selecting, from among the text data of the plurality of types, text data that is to be superimposed.

4. A moving-picture processing method comprising:
a receiving step of receiving from an external apparatus (i) digital moving-picture data which is coded in accordance with a coding method that utilizes correlation between a plurality of frames, represented by the coded digital moving-picture data, and (ii) command data for commanding image modification processing to be applied to the digital moving-picture data;
a decoding step of decoding the coded digital moving-picture data; and
a processing step of subjecting the decoded digital moving-picture data to image modification processing in accordance with the command data, and
wherein said image modification processing comprises superimposing processing.

5. The method according to claim 4, wherein said command data includes text data of a plurality of types.

6. The method according to claim 5, further comprising a selecting step of selecting, from among the text data of the plurality of types, text data that is to be superimposed.

7. A moving-picture processing apparatus comprising:
receiving means for receiving from an external apparatus (i) digital moving-picture data which is coded in accordance with a coding method that utilizes correlation between a plurality of frames, represented by the coded digital moving-picture data, and (ii) command data for commanding image modification processing to be applied to the digital moving-picture data;

decoding means for decoding the coded digital moving-picture data; and image modification processing means for subjecting the digital moving-picture data decoded by said decoding means to image modification processing in accordance with the command data, wherein said image modification processing comprises a processing which gradually changes a content of successive frames whose data is included in the decoded digital moving-picture.

8. A moving-picture processing apparatus comprising:

receiving means for receiving from an external apparatus (i) digital moving-picture data which is coded in accordance with a coding method that utilizes correlation between a plurality of frames, represented by the coded digital moving-picture data, and (ii) command data for commanding image modification processing to be applied to the digital moving-picture data;

decoding means for decoding the coded digital moving-picture data; and processing means for increasing a number of frames of the digital moving-picture data decoded by said decoding means, and for modifying the digital moving-picture data which has said increased number of frames in accordance with the command data, and wherein said processing means gradually changes a content of successive frames which are included in said digital moving-picture increased number of frames.

9. Apparatus according to claim 8, wherein the processing performed by said processing means comprises fading processing.

10. Apparatus according to claim 8, wherein the processing performed by said processing means comprises wiping processing.

11. A moving-picture processing method comprising:

a receiving step of receiving from an external apparatus (i) digital moving-picture data which is coded in accordance with a coding method that utilizes correlation between a plurality of frames, represented by the coded digital moving-picture data, and (ii) command data for commanding image modification processing to be applied to the digital moving-picture data;

a decoding step of decoding the coded digital moving-picture data; and a processing step of increasing a number of frames of the digital moving-picture data decoded at said decoding step, and modifying the digital moving-picture data which has said increased number of frames in accordance with the command data, said processing step gradually changes a content of successive frames which are included in said digital moving-picture increased number of frames.

12. The method according to claim 11, wherein the processing performed in said processing step comprises fading processing.

13. The method according to claim 11, wherein the processing performed in said processing step comprises wiping processing.

14. A moving-picture processing apparatus comprising:

receiving means for receiving from an external apparatus (i) digital moving-picture data which is coded in accordance with a coding method that utilizes correlation between a plurality of frames, represented by the coded digital moving-picture data, and (ii) command data for commanding image modification processing to be applied to the digital moving-picture data;

decoding means for decoding the coded digital moving-picture data; and superimposing processing means for subjecting the digital moving-picture data decoded by said decoding means to image modification processing in accordance with the command data, wherein the command data is developed into a character image by using a memory and thereafter superimposed on the decoded digital moving-picture by said image processing means.

15. Apparatus according to claim 14, further comprising instruction means for providing an instruction for changing a condition of the character image.

16. Apparatus according to claim 15, wherein said instruction means is capable of providing an instruction to superimpose/not superimpose the character image.

17. Apparatus according to claim 15, wherein said instruction means is capable of providing an instruction for providing a superimposing location of the character image.

18. Apparatus according to claim 15, wherein said instruction means is capable of providing an instruction indicating a size of the character image.

19. Apparatus according to claim 15, wherein said instruction means is capable of providing an instruction indicating a color of the character image.

20. A moving-picture processing apparatus comprising:

receiving means for receiving from an external apparatus (i) digital moving-picture data which is coded in accordance with a coding method that utilizes correlation between a plurality of frames, represented by the coded digital moving-picture data, and (ii) command data for commanding image modification processing to be applied to the digital moving-picture data;

decoding means for decoding the coded digital moving-picture data; and processing means for modifying the digital moving-picture data in accordance with the command data, wherein said processing means gradually changes a content of successive frames which are included in said digital moving-picture data.

21. Apparatus according to claim 20, wherein the processing performed by said processing means comprises fading processing.

22. Apparatus according to claim 20, wherein the processing performed by said processing means comprises wiping device.

23. A moving-picture processing method, comprising the steps:

receiving from an external apparatus (i) digital moving-picture data which is coded in accordance with a coding method that utilizes correlation between a plurality of frames, represented by the coded digital moving-picture data, and (ii) command data for commanding image modification processing to be applied to the digital moving-picture data;

decoding the coded digital moving-picture data; and subjecting the digital moving-picture data decoded in said decoding step to superimposing processing in accordance with the command data, wherein the command data is developed into a character image by using a memory and thereafter superimposed on the decoded digital moving-picture in said subjecting step.

24. A method according to claim 23, further comprising the step of providing an instruction to change a condition of the characteristic image.

25. A method according to claim 24, wherein said instructing step is capable of providing an instruction to superimpose/not superimpose the character image.

26. A method according to claim 24, wherein said instruction step is capable of providing a superimposing location of the character image.

27. A method according to claim 24, wherein said instruction step is capable of providing an instruction indicating a size of the character image.

28. A method according to claim 24, wherein said instruction step is capable of providing an instruction indicating a color of the character image.

29. A moving-picture processing method comprising the steps of:

receiving from an external apparatus (i) digital moving-picture data which is coded in accordance with a coding method that utilizes correlation between a correlation of frames, represented by the coded digital moving-picture data, and (ii) command data for commanding image modification processing to be applied to the digital moving-picture data;

decoding the coded digital moving-picture data; and modifying the digital moving-picture data in accordance with the command data, wherein said modifying step gradually changes a content of successive frames which are included in the modified digital moving-picture data.

30. A method according to claim 29, wherein the processing performed in said modifying step comprises fading processing.

31. A method according to claim 29, wherein the processing performed in said modifying step comprises wiping processing.

32. A computer-readable medium encoded with a program for performing moving-picture processing in accordance with the following steps:

receiving from an external apparatus (i) digital moving-picture data which is coded in accordance with a coding method that utilizes correlation between a plurality of frames, represented by the coded digital moving-picture data, and (ii) command data for commanding image modification processing to be applied to the digital moving-picture data;

decoding the coded digital moving-picture data; and increasing a number of frames of the digital moving-picture data decoded in said decoding step, and modifying the digital moving-picture data which has the increased number of frames in accordance with the command data, said increasing step gradually changing a content of successive frames which are included in the digital moving-picture increased number of frames.

33. A medium according to claim 32, wherein the medium comprises a magnetic recording medium.

34. A medium according to claim 32, wherein the medium comprises a disc-shaped recording medium.

35. A medium according to claim 32, wherein the processing performed in the increasing step comprises fading processing.

36. A medium according to claim 32, wherein the processing performed in said increasing step comprises wiping processing.

37. A computer-readable medium encoded with moving-picture processing steps, comprising:

a receiving step for receiving from an external apparatus (i) digital moving-picture data which is coded in accordance with a coding method that utilizes correlation between a plurality of frames, represented by the coded digital moving-picture data, and (ii) command data for commanding image modification processing to be applied to the digital moving-picture data;

a decoding step for decoding the coded digital moving-picture data; and an image modification processing step for subjecting the digital moving-picture data decoded by said decoding step to superimposing processing in accordance with the command data, wherein the command data is developed into a character image by using a memory and thereafter superimposed on the decoded digital moving-picture by said image processing step.

38. A medium according to claim 37, further comprising the step of providing an instruction to change a condition of the character image.

39. A medium according to claim 38, wherein the instruction step is capable of providing an instruction to superimpose/not superimpose the character image.

40. A medium according to claim 38, wherein said instruction step is capable of providing an instruction for providing a superimposing location of the character image.

41. A medium according to claim 38, wherein said instruction step is capable of providing an instruction indicating a size of the character image.

42. A medium according to claim 38, wherein said instruction step is capable of providing an instruction indicating a color of the character image.

43. A storage medium containing computer-readable code for carrying out moving-picture processing according to the following steps:

a receiving step for receiving from an external apparatus (i) digital moving-picture data which is coded in accordance with a coding method that utilizes correlation between a plurality of frames, represented by the coded digital moving-picture data, and (ii) command data for commanding image modification processing to be applied to the digital moving-picture data;

a decoding step for decoding the coded digital moving-picture data; and a processing step for modifying the digital moving-picture in accordance with the command data, wherein said processing step gradually changes a content of successive frames which are included in said digital moving-picture data.

44. A medium according to claim 43, wherein the processing performed by said processing step comprises fading processing.

45. A medium according to claim 43, wherein the processing performed by said processing step comprises wiping processing.

* * * * *

UNITED STATES PATENT AND TRADEMARK OFFICE
CERTIFICATE OF CORRECTION

PATENT NO. : 5,786,864
DATED : July 28, 1998
INVENTOR(S) : KUNIHIRO YAMAMOTO

It is certified that error appears in the above-identified patent and that said Letters Patent is hereby corrected as shown below:

Column 1

Line 40, "FIG. 2B" should read --FIG. 2B shows--.

Column 10

Line 41, "device." should read --processing.--.
    Line 43, "steps:" should read --steps of:--.

Signed and Sealed this

Twentieth Day of April, 1999

Attest:

Q. TODD DICKINSON

*Attesting Officer*      *Acting Commissioner of Patents and Trademarks*